Figure 1:
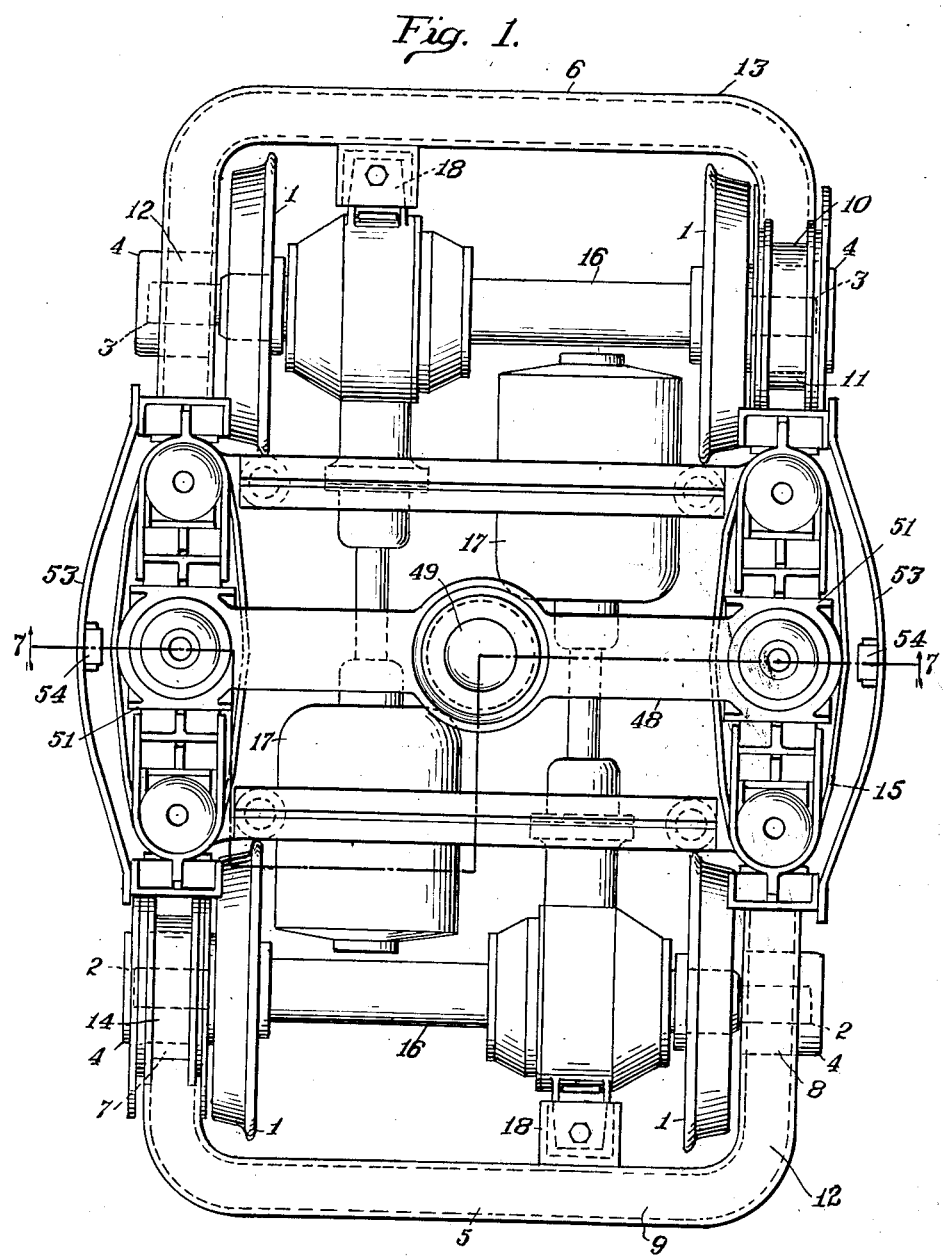

Nov. 11, 1952 E. H. PIRON 2,617,366
RAIL CAR TRUCK
Filed March 19, 1948 4 Sheets-Sheet 1

INVENTOR.
Emil H. Piron
BY
ATTORNEY

Nov. 11, 1952  E. H. PIRON  2,617,366
RAIL CAR TRUCK
Filed March 19, 1948  4 Sheets-Sheet 2
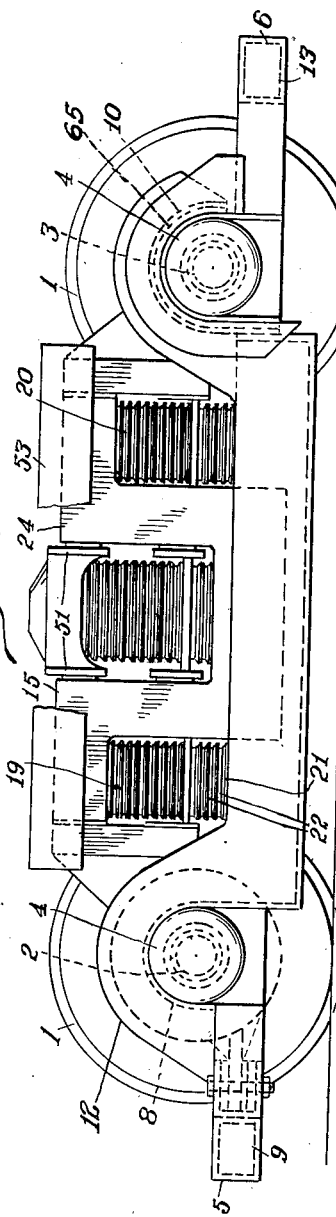
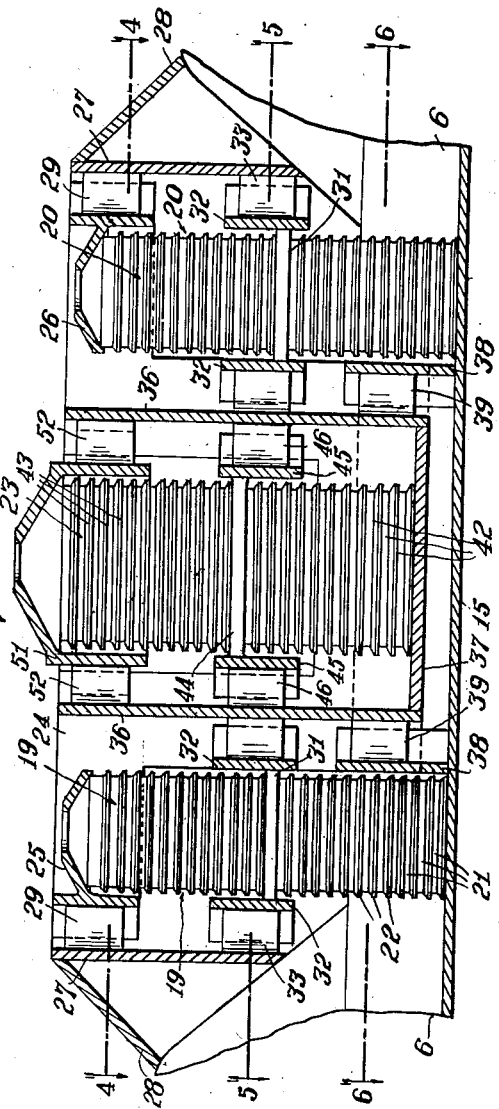
INVENTOR.
Emil H. Piron
BY
ATTORNEY

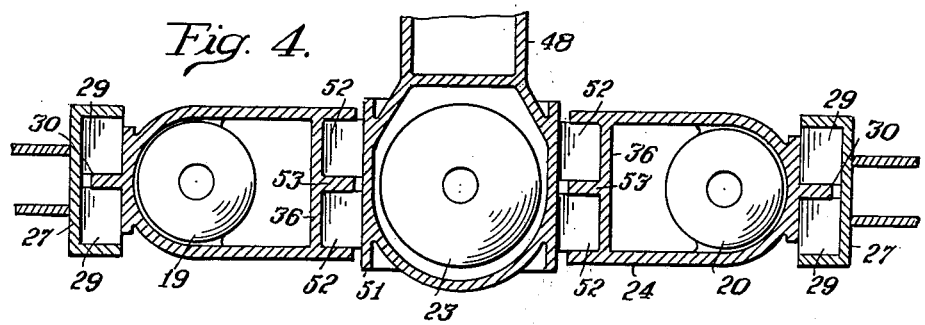
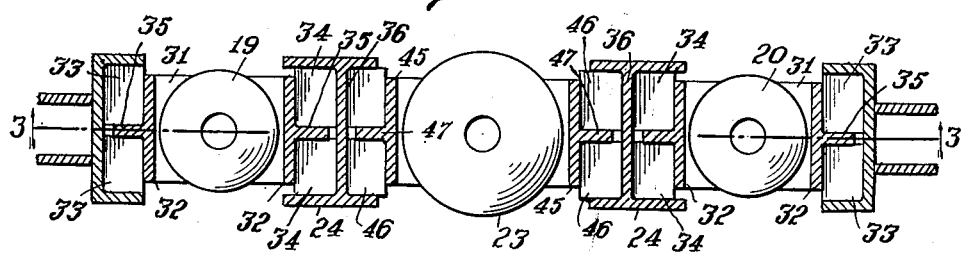
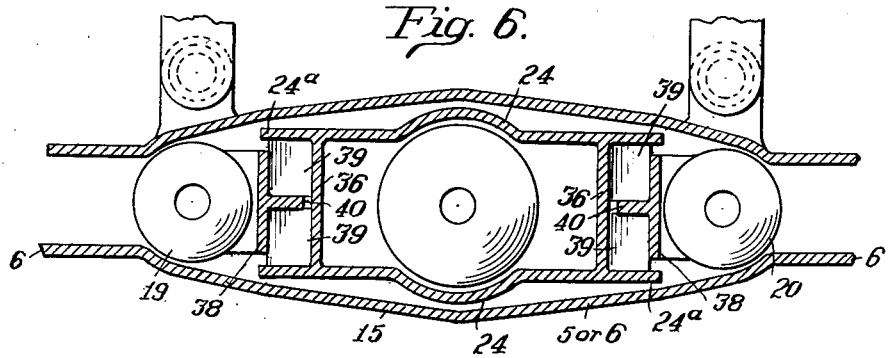

Nov. 11, 1952     E. H. PIRON     2,617,366
RAIL CAR TRUCK
Filed March 19, 1948     4 Sheets-Sheet 4
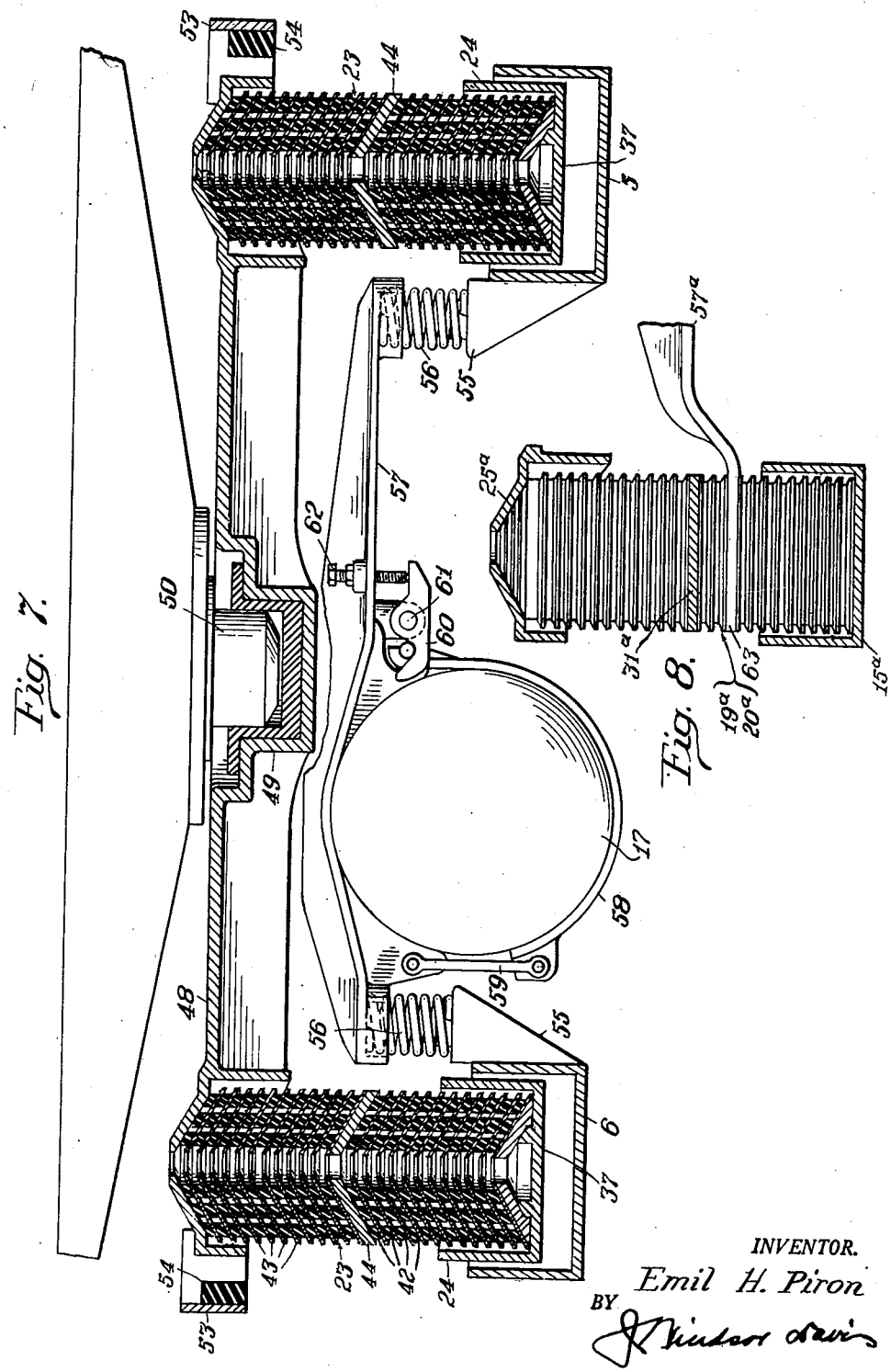
INVENTOR.
Emil H. Piron
BY
ATTORNEY Patented Nov. 11, 1952

2,617,366

UNITED STATES PATENT OFFICE 2,617,366

RAIL CAR TRUCK

Emil H. Piron, New York, N. Y., assignor to Transit Research Corporation, New York, N. Y., a corporation of New York Application March 19, 1948, Serial No. 15,830

5 Claims. (Cl. 105—197)

This invention relates to rail trucks and has for its object to provide a truck which will give improved riding comfort, at high speed, and which will be sturdy, reliable and comparatively economical to build.

For high speed operation it is necessary to provide springs having large deflections. Rubber has proven to be an excellent springing medium for rail trucks because of its ability to insulate a car body from the short wave vibrations of the truck frame and also because of its hysteresis which serves, inherently, as a shock absorber. While it is possible to obtain great deflection by stressing rubber in shear or in bending, the life of rubber is greatest and the structural parts employed therewith can be made safer when the rubber is stressed in compression.

It is therefore a principal object of this invention to provide a primary springing system in which the rubber receives vertical loading in compression and which will provide large deflections.

Since the maximum deflection of rubber in compression is about twenty-five percent of its height and since a twelve-inch deflection, for instance, therefore requires a column of rubber four feet high, it is necessary to divide the column into several springs capable of being coordinated to give the desired final effect. An object of this invention is to provide springs suitable for this purpose and more specifically, to provide springs which are made or formed by stacking rubber conical discs on top of each other, by interposing similarly shaped metallic discs between the rubber discs and by guiding certain of the conical discs in such manner as to prevent buckling of the stack. The springs are then used in parallel and in series or both to provide the proper volume of rubber to support the required loads.

A further object is to employ the rubber springs or a portion of them to support the truck bolster for lateral motions. The reasons for this are that by substituting a springing support for the customary swing links, a better control of the lateral bolster motions may be obtained and riding quality therefore enhanced.

It will be seen hereinafter that, when a column of rubber is employed to support the bolster it may have too small resistance to lateral forces which, when carried to the extreme, may result in buckling of the rubber with loss of its ability to restore the bolster to center. Another object of the invention is to provide guides intermediate the height of the bolster supporting spring, as above described, to prevent buckling, and to so select the position of the guides with respect to the height of the column that the exact desired resistance to lateral motions of the bolster results. In other words, the guides prevent lateral deflections of all rubber below the guides so then when the height of the column of rubber necessary to give the ideal resistance to lateral motions of the bolster is determined it may be exactly provided merely by inserting the guide at that point in the height of the spring.

In order to obtain the maximum benefits from this improved springing system it is necessary to support it on a sturdy frame and this frame must control the axles so that they run parallel with each other. My experience has shown that one of the phenomenon of truck operation having great influence on its riding quality is the lateral weaving motion known as hunting. If the axles can get out of parallel the leading wheel cannot be relied upon to cause the plane of the wheels to remain parallel with the direction of motion.

Another object of this invention is to provide a truck frame which will be highly rigid against horizontal forces but which will have vertical flexibility, and in which frame the journal boxes of the axles will be held against relative motion.

Another object is to provide a truck comprising a single frame. Since the springing system is composed of sets of parallel springs acting in series with other springs I employ spring saddles as load transfer means therebetween. However the spring saddles at opposite sides of the truck are not connected because to do so would form an intermediate frame which could be expected to find resonance with the body at certain speeds. The natural result would be noise.

The truck herein described may be used as a power truck, or not. Another object of the invention is to provide proper and suitable motor suspension means, in alternative forms, for the truck when used as a power truck.

A further object is to provide improved snubbing means and bumper means for the bolster, all of which objects and advantages will become more apparent as reference is had to the accompanying drawings wherein my invention is illustrated by way of example and in which Figure 1 is a top plan view of my improved truck, Figure 2 is a side elevation of the truck, Figure 3 is an enlarged view of the springing system taken along the line 3—3 of Figure 5, Figure 4 is a horizontal section taken along the line 4—4 of Figure 3, Figure 5 is a horizontal section taken along the line 5—5 of Figure 3, Figure 6 is a horizontal section taken along the line 6—6 of Figure 3, Figure 7 is a transverse vertical section taken along the line 7—7 of Figure 1, and Figure 8 is a view of one of the large springs of Figure 7 in elevation with the load imposing and load receiving members in section, showing this spring used as a motor supporting means, as a modification of the motor support of Figures 1 and 7.

More particularly, 1 indicates the rail contacting wheels having axles 2 and 3 which support journal bearings 4. The frame is composed, essentially, of two identical main members 5 and 6. The frame member 5, as viewed in Figure 1, has a goosenecked end 7 which overlies the journal bearing 4 at the left end of the axle 2, it then forms a cross member 9 which is integral with a goosenecked portion 8 which overlies the journal bearing 4 at the right end of the axle 2 and continues, integrally as an integral part of the longitudinal or side frame member which terminates in a goosenecked end 10. The end 10 overlies the goosenecked end 11 of the member 6 which directly overlies the journal bearing at the right end of the axle 3.

The frame member 6 forms the cross member 13 and is integral with the goosenecked portion 12 which directly overlies the journal bearing 4 at the left end of the axle 3. The member 6 then continues integrally with the longitudinal or side frame member to a third goosenecked end 14 which overlies the goosenecked end 7 of the member 5. A rubber liner 65 separates the overlapping frame ends, as best seen in Figure 2.

This general type of frame is more fully shown and described in my copending application Ser. No. 758,941 filed July 3, 1947. The frame shown herewith departs from that of my prior application particularly in that the portions of the main frame members forming side rails are widened, and strengthened at their midportions 15 and the top of each is open to receive the main truck springs, as will be hereinafter explained.

The axles are equipped with axle housings 16 enclosing suitable gearing for connecting the axles to motors 17, when the truck is powered. The axle housings each have torque arms 18 pivotally connected to the cross members 9 and 13, respectively.

Inset into the side frame portions 15 of the two main members are the main truck springs. The springs are identical at the two sides of the truck so that only one side will be referred to. As best seen in Figure 3, I provide two identical springs 19 and 20 which are substantially spaced from each other and which rest directly on the bottom of the side frame 15. These springs are, essentially, columns of rubber, each composed of a plurality of rubber conical discs 21, vertically stacked, separated by similarly coned metallic discs 22. The construction is exactly the same as that of the third spring 23 shown in section in Figure 7, the only difference being that the spring 23, as illustrated, is slightly larger in diameter than the springs 19 and 20.

A spring saddle 24 rests jointly on the two springs 19 and 20 by means of spring caps 25 and 26 integral therewith. End walls 27 are welded and braced at 28 to the main frame member 6 and blocks of rubber 29 are inserted between the end walls 27 and the spring caps 25 and 26. The blocks are held in place vertically as by being bonded to the end walls and are in constant frictional contact with the skirts of the spring caps 25 and 26. As best seen in Figure 4, there are two blocks 29 at each end of the saddle and the saddle has an end projection 30 extending between each two blocks, the saddle thus being retained against lateral displacement and therefore limited to vertical movements with respect to the member 6.

Intermediate the height of each spring 19 and 20 one metallic disc 31 is made heavier than the others and each carries two guide plates 32 as best seen in Figures 3 and 5. Between one guide plate 32 of each spring and the adjacent end wall 27 I insert a pair of blocks of rubber 33 and between the other guide plate 32 of each spring and a transverse wall 36 of the spring saddle 24 I insert two blocks of rubber 34. Each of the guide plates 32 has an extension 35 which extends between the members of one pair of rubber blocks. All of the rubber blocks are maintained against displacement vertically and laterally with respect either to the guides 32 or with respect to the end walls 27 and saddle 24. If the blocks are held stationary on the end walls 27 and the saddle 24 then the guide means 32 and 35 have frictional contact with the blocks, the friction resisting relative vertical movements of the plates 31. The guides prevent buckling of the springs. While only one intermediate heavy plate 31 is shown per spring, obviously others could be added, with guides, if one is not sufficient to preclude buckling of the springs 19 and 20 or if it is merely desired to increase the friction in the system.

The transverse walls 36 of the saddle 24 extend to the bottom 37 of the spring saddle, the bottom 37 being vertically spaced from the bottom of the frame section 15 in order to allow relative vertical motions of the spring saddle with respect to the frame section. Arising from the bottom of the frame section 15 are two wall members 38 (Fig. 3). Between these members and the transverse walls 36 I provide rubber blocks 39 which are bonded either to the walls 38 or to the walls 36 but not to both. If bonded to the walls 36 the blocks have sliding frictional contact with the walls 38 for relative vertical movements thereof with respect to the walls 36. As best seen in Figure 6, the blocks 39 are in pairs and each wall 38 has a rib 40 extending between the members of its adjacent pair of blocks. The sidewalls of the saddle 24 extend outwardly beyond the walls 36 as indicated at 24a thus aiding in retaining the blocks against lateral displacement. The bottom of the spring saddle 24 may thus move vertically with respect to the side frame 6 but is retained against relative lateral movements with respect thereto.

Resting upon the bottom 37 of the spring saddle 24 is a spring generally designated by the numeral 23. This spring also is composed of a plurality of conical discs 42 of rubber separated by similarly coned metallic discs 43, as is sectionally shown in Figure 7. An intermediate metallic disc 44 is heavier than the other discs 43 and carries guide plates 45 (Figs. 3 and 5). Between these plates 45 and the walls 36 of the saddle I provide pairs of rubber blocks 46, preferably bonded to the wall 36. A rib 47 carried by each guide plate 45 extends between the members of one pair of rubber blocks 46 (Fig. 5). The disc 44 can thus move vertically but not laterally with respect to the saddle 24.

A truck bolster 48 having a center bearing 49 to receive a king pin 50 is supported on the springs 23, as is best shown in Figures 1 and 7. The bolster has dropped sidewalls 51 for frictional engagement with pairs of rubber blocks 52 (Fig. 4) bonded to the saddle walls 36. A rib 53 extends from each wall 36 between the members of the pairs of blocks 52 thus preventing lateral displacement of the blocks. The bolster 48 is free to move vertically and laterally with respect to the blocks 52 but its movement with respect to the bolser saddle in either direction is resisted by friction between the blocks 52 and the bolster.

The operation is as follows: As the truck travels along the rails the axles are maintained parallel by the rigidity of the frame and the fit of the frame and the journals. Each frame member is directly connected to both ends of one axle and is connected to the other axle by overlying an end of the other frame member, giving great rigidity to distortion by horizontal forces. Since unevennesses of the track caused mainly by looseness or uneven heights of adjacent rails at the joints requires frequent changes in the relative elevation of the wheels the frame is capable of flexibility vertically—that is, one wheel may be elevated without tendency to elevate the other wheels by reason of the articulation of the frame members at diagonally opposite corners. The frame thus prevents hunting of the wheels without subjecting the frame members to distortions liable to cause fracture as would be the case without the articulations. With this arrangement the nonhunting properties are improved to the advantage of the springing system. The springing system at each side of the truck frame is composed of two spaced springs 19 and 20 which rest directly upon the bottoms of the side frames 5 and 6. These springs are guided intermediate their heights by the guide means 27, 32, 33, 34, 35, 36. The guide means permit full vertical springing movement of the springs 19 and 20 but prevents buckling thereof. The coned shape of the discs adds stability.

The springs 19 and 20 carry a spring saddle which is guided so that its motions are restricted to the vertical by the blocks 29 and 39. The spring saddle on each side frame supports a spring 23 which, in turn, supports the bolster 48. The springs 23 are therefore in series jointly with the two springs 19 and 20, the springs 19 and 20 acting in parallel, under vertical loading by the bolster.

The springs 23 also resist horizontal movements of the bolster 48. These springs 23 are of substantial height and would offer insufficient resistance to the swinging of the bolster if the entire height were used. In order to avoid buckling of these springs I insert guide means comprising the conical plates 44, the guide plates 45 and the blocks 46 which contact the walls 36 of the saddle. The guide means prevents participation of that part of the springs below the plates 44 in resistance to lateral swinging of the bolster. I can, therefore, choose the amount of resistance to swinging of the bolster merely by selecting the height at which the plate 44 is inserted in each instance. And if operation shows that more or less resistance to the motions of the bolster is desired the location of this plate can be moved down or up as desired. The coned shape of the discs 42, 43 and 44 adds substantially to the resistance offered to lateral swinging since the rubber is stressed partially in shear and partially in compression. If the conicity is increased the proportion of compression to shear is increased and vice versa. For standard size trucks intended for service of the order of 85 to 100 M. P. H. I prefer about a 30° angle of conicity. This will vary with spring diameter, however.

The rubber springs 19, 20 and 23 absorb a substantial amount of vibrations, particularly those having high frequency, by hysteresis. There is no metallic path through the springing system for the transmission of vibrations, and there is much friction incorporated in the system by the action of the several pairs of rubber guide blocks acting as friction means. Elimination of shock absorbers is a material advantage particularly from a maintenance standpoint. To guard against overswinging of the bolster as may be caused by a collision or other accidental condition I provide a strap 53 outwardly of each end of the bolster (Figs. 1 and 7) each of which carries a rubber bumper block 54.

It will be noted further that the usual intermediate frame has been omitted, the spring saddle at one side of the truck not being connected with the spring saddle at the opposite side. Since the intermediate frame in the conventional truck finds resonance with the body at certain speeds it is a source of substantial noise and discomforting vibrations.

In order to support the motors 17 I provide brackets 55 on each member 5 and 6 (Figs. 1 and 7). These brackets support springs 56 which support a motor supporting beam 57 to which the motors are attached by the straps 58. One end of each strap is attached to the beam 57 by a link 59 and the other end is held against the beam by a finger 60 fulcrumed on a pivot 61 and forced firmly into place by a screw 62 extending through each beam 57.

An alternative plan for supporting the motors 17 is shown in Figure 8 in which each spring 19a and 20a, corresponding to the springs 19 and 20 previously described, is provided with a plate 31a corresponding to the plate 31 and a second heavy plate 63 to which the motor supporting beam 57a is attached. This modification saves the cost of the springs 56 and their brackets 55, and it does this without introducing the objectionable intermediate frame. The plates 31a and 63 may be combined into one plate if the correct height for motor springing happens to coincide with the correct height of the plates 31 which determine the amount of lateral motions of the bolster, if the use of an intermediate frame were not considered objectionable.

Various modifications may be made without departing from the spirit of my invention and I therefore desire to be extended protection as defined by the appended claims.

What I claim is:

1. In a rail truck, a frame including longitudinal members, a bolster and springing means supporting said bolster from each of said longitudinal members, said springing means comprising longitudinally spaced spring columns, a spring saddle connecting said columns, guide means restricting the saddle to vertical movements with respect to its adjacent member, and a further spring column supported by said saddle directly supporting one end of said bolster, the saddle above each of said members being adapted to deflect on its spring columns independently of the other saddle, and further guide means intermediate the height of said further columns active against vertically extending walls of said saddles limiting movement of that portion of said columns below said further guide means to vertical deflections while allowing that portion of said columns above said further guide means to yield laterally in response to swinging movements of said bolster.

2. In a rail truck, a frame including longitudinal members, a bolster and springing means supporting said bolster from each of said longitudinal members, said springing means comprising longitudinally spaced springs, a spring saddle connecting said springs; guide means restricting the saddle to vertical movements with respect to its adjacent member, and a further spring supported by said saddle directly supporting one end of said bolster, said further spring deflecting in response to vertical loading imposed by said bolster, means carried by said further spring intermediate its height active to resist lateral deflection of that portion of said further spring between said means and said saddle, said means being movable with vertical movements of the intermediate portion of said further spring and frictionally engaging the sidewalls of said saddle, that portion of said further spring between said means and said saddle deflecting in response to lateral swinging movements of said bolster.

3. In a rail truck, a frame including longitudinal members, a bolster and springing means supporting said bolster from said members, said springing means comprising spaced columns of rubber, guide means associated with each of said columns intermediate the height thereof restricting the deflecting movements of said spring to the vertical, a spring saddle at each side of said frame connecting the columns on the respective sides, further guide means restricting movements of said saddles to the vertical, a further column of rubber supported by each of said saddles supporting the ends of said bolster, and further guide means restricting a lower portion of said further columns to vertical deflections while allowing lateral deflections of the upper portions thereof in response to lateral swinging movements of said bolster, all of said guide means being of the frictional type thereby exerting a damping effect on the springing movements of all of said columns.

4. In a rail truck, a frame including longitudinal members, a bolster and springing means supporting said bolster from said members, said springing means comprising spaced columns of rubber, guide means associated with each of said columns intermediate the height thereof restricting the deflecting movements of said spring to the vertical, a spring saddle at each side of said frame connecting the columns on the respective sides, further guide means restricting movements of said saddles to the vertical, a further column of rubber supported by each of said saddles supporting the ends of said bolster, and further guide means restricting a lower portion of said further columns to vertical deflections while allowing lateral deflections of the upper portions thereof in response to lateral swinging movements of said bolster, all of said guide means being of the frictional type thereby exerting a damping effect on the springing movements of all of said columns, and resilient pads between said saddles and each end of said bolster in continuous contact with said bolster frictionally resisting lateral movements of said bolster and constituting the means through which driving and retarding forces are transmitted between said bolster and said frame.

5. In a rail truck, a truck frame having longitudinal members, a bolster, a springing system supporting said bolster from each of said members comprising two spaced columns of rubber, a spring saddle resting atop and connecting said columns, a spring supported by said saddle supporting an end of said bolster, the saddle on each side of the frame having motions independent of the saddle at the other side of said frame, main driving motors, beams supporting said motors, and metallic plates inserted in said spaced columns intermediate their height, said beams being fixedly secured at their ends to two of said metallic plates located at opposite sides of said frame for resilient support of said motors.

EMIL H. PIRON.

REFERENCES CITED

The following references are of record in the file of this patent:

UNITED STATES PATENTS

| Number | Name | Date |
|---|---|---|
| 2,165,702 | Hanshalter | Nov. 11, 1939 |
| 2,099,031 | Neal et al. | Nov. 16, 1937 |
| 2,184,102 | Piron | Dec. 19, 1939 |
| 2,233,110 | Piron | Feb. 25, 1941 |
| 2,242,212 | Hankins | May 20, 1941 |
| 2,321,845 | Nystrom et al. | June 15, 1943 |
| 2,331,174 | Carpenter | Oct. 5, 1943 |
| 2,346,860 | Mohl | Apr. 18, 1944 |